L. G. COPEMAN.
GREASE CUP.
APPLICATION FILED JUNE 5, 1918.
1,300,699.
Patented Apr. 15, 1919.
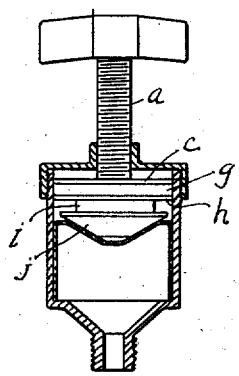
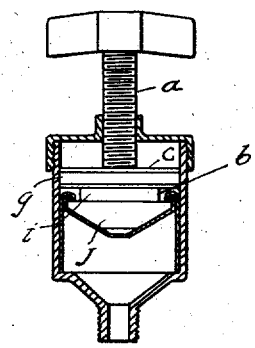
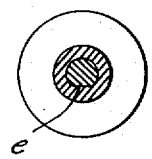
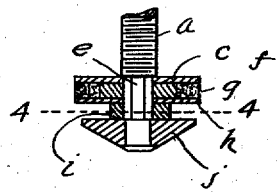
Inventor
Lloyd Groff Copeman
By Stuart C Barnes
Attorney
Witness

UNITED STATES PATENT OFFICE.

LLOYD GROFF COPEMAN, OF FLINT, MICHIGAN, ASSIGNOR TO COPEMAN DEVELOPMENT CO., OF FLINT, MICHIGAN, A CORPORATION OF MICHIGAN.

GREASE-CUP.

1,300,699.   Specification of Letters Patent.   Patented Apr. 15, 1919.

Application filed June 5, 1918. Serial No. 238,321.

*To all whom it may concern:*

Be it known that I, LLOYD GROFF COPEMAN, a citizen of the United States, residing at Flint, county of Genesee, State of Michigan, have invented a new and useful Improvement in Grease-Cups, of which the following is a specification.

This invention relates to grease cups and has for its object a grease cup provided with a plunger that is designed to effectively pick up a collapsed grease capsule to extract the same from the cup when the plunger is drawn out.

Capsule extractors for grease cups are not broadly new. An improvement for more effectively securing this object is what will be described and claimed.

In the drawings,—

Figure 1 is a longitudinal section of the grease cup and capsule showing the action of the plunger when first contacting the capsule.

Fig. 2 is a similar view showing the action of the plunger on the capsule when the plunger is screwed farther down.

Fig. 3 is a sectional detail of the plunger showing how it is constructed to secure the most effective action.

Fig. 4 is a section on the line 4—4 of Fig. 3.

Fig. 5 is an elevation of the capsule.

The use of grease capsules for containing quantities of grease to be inserted in a grease cup has come into quite general use. These capsules would be more or less ineffective for their purpose, especially on automobiles, were they not made absolutely fool-proof, that is to say, if they were not made to take care of themselves where ignorance or negligence of the car owner might leave them in a position which will cause injury to the car. For instance, if the cars were initially provided with these grease capsules and the owner was ignorant of the fact, he might attempt to re-fill the grease cup without taking out the capsule. It would then be trying to force the new grease down through the capsule which would lie at the bottom of the grease cup and plug the hole into the bearing.

Extractors used in connection with the plunger for picking up the capsule so that the capsule will not have to be removed by some sharp instrument after the plunger has been taken out, are broadly old. These extractors, however, are not infallible in their action. It is the object of this invention to more effectively pick up the capsule so as to make the extractor work on practically every occasion. This is a very material consideration in making this form of lubrication successful in automobile work for the reason already explained, that it makes the grease cup fool-proof.

The plunger is the ordinary screw type with the screw $a$ but is of special construction, hereinafter to be described more in detail. It is provided with an annular groove $b$. The plunger is of reduced diameter to the inside of the groove. This allows the substance of the capsule to be forced up into this groove $b$ to pick up the capsule. So much of the construction is old and has already been patented, but as already stated, this is not an infallible worker in picking up a collapsed capsule. In a prior patent it has been proposed to make the capsule dome shaped to facilitate the crowding of the sides of the capsule up into the groove. This accomplishes the purpose but the capsule construction is somewhat expensive. I have found that by making the reduced portion of the plunger to the inside of the annular groove $b$ of a frusto-conical shape or an equivalent bowled configuration it tends to dent in the middle portion at the head of the plunger first as shown in Fig. 1, and thereby starts the capsule collapsing in the correct way to cause the sides of the collapsed capsule to curl up into the annular groove $b$ in the fashion shown in Fig. 2. This action almost infallibly occurs, whereas with a straight flat plunger which is ordinarily used, some of the capsules may be started collapsing in such a way that it forbids curling of the edges of the side up into the groove $b$.

Another feature of my improvement is in the plunger construction which is detailed in Figs. 3 and 4. I have found that it is advantageous to have the packing portions of the plunger, especially the washer that immediately abuts with the screw threads, turn with the screw; otherwise I find that with constant use the threads that abut against the washer become worn, which would tend to loosen the entire plunger construction and allow it to become cocked in the grease cup and cramped. On the other hand, if the portion of the plunger that engages with the grease capsule turns it will very easily tear a hole in the grease capsule and allow the grease to exude back of the capsule. It is especially disadvantageous to have the portion contacting the capsule revolve with the screw where an annular groove, such as shown, is used to pick up a collapsed capsule for obviously the rotating of the portion over which the capsule curls in entering the groove may very easily force the curling portions back ahead of the plunger so that the picking up function of the plunger does not take place. I have, therefore, constructed the plunger so that the washer $c$ that immediately abuts the screw threads does not rotate relatively to the screw threads as it engages a flattened portion $e$ of the plunger stem. The washer $f$ that centers the felt packing $g$ and the washer $h$ that confines the packing $g$ on the inside, and the spacing washer $i$, also are provided with circular holes having filled chords to engage with the flattened stem portion to secure them in non-rotating relation with respect to the screw. On the other hand, it will be seen that the immediate end of the stem is of true circular cross section, and on this may rotate the frusto-conical end portion $j$ of the plunger. Whether or not the intervening washer and packing rotate with the stem or not is not so material. The point is that the washer abutting the screw threads should not rotate so that it will not bear upon the screw threads and cause the entire plunger to become loose so as to be capable of cramping in the cup. The washer that contacts the capsule must rotate upon the plunger stem so as not to tear on the capsule.

What I claim is:

1. In a grease cup adapted to contain a grease capsule, a plunger constructed of two or more washers, a screw-threaded stem, the washer immediately abutting the screw-threads being fixed upon the stem so as to rotate with the stem while the washer on the immediate end is mounted loosely upon the stem.

2. In a grease cup adapted to contain a grease capsule, a barrel, a capsule contained in the barrel and a plunger built up of two or more washers, and a screw-threaded stem, the washer immediately abutting the screw-threads being fixed upon the screw-threaded stem to rotate therewith and the washer upon the immediate end of the stem which contacts the grease capsule being mounted loosely on the screw-threaded stem.

3. In a grease cup adapted to contain a grease capsule, a barrel, a grease capsule contained within the barrel and a plunger made up of a screw-threaded stem, a washer immediately abutting the screw-threads and arranged to rotate with the screw stem, a centering washer inside of said first-mentioned washer, a felt packing ring thereabout, a third washer to the inside of the felt packing on the stem, a spacing washer to the inside of the last-mentioned washer, and a final washer on the end of the stem the last of which does not turn with the stem and contacts the head of the grease capsule.

4. In a grease cup adapted to contain a grease capsule, a barrel, a plunger adapted to be forced into the barrel, the said plunger having a recess and provided with a portion on its inner end which has a substantially tapering configuration, the said portion being somewhat spaced from the barrel to allow an annular passage connecting said recess, a capsule contained within the barrel and whose head is adapted to be contacted by the end of the plunger to dent the capsule and insure the side edges of the capsule curling through said annular passage into the recess of the plunger.

5. In a grease cup, a barrel, a plunger adapted to be forced into the barrel and having an annular recess with a plunger portion at the end of the plunger stem of a diameter reduced as compared with that of the barrel to form an annular passage opening into the said annular recess, said reduced portion of the plunger having an approximate frusto-conical shape, and a grease capsule contained within the barrel and adapted to be dented by the frusto-conical portion of the plunger to force the side edges of the capsule up into the said annular passage and into the said annular recess.

In witness whereof I have hereunto set my hand on the 1st day of June 1918.

LLOYD GROFF COPEMAN.